E. W. WALLACE.
DENTAL INSTRUMENT.
APPLICATION FILED JULY 22, 1909.
951,891.
Patented Mar. 15, 1910.
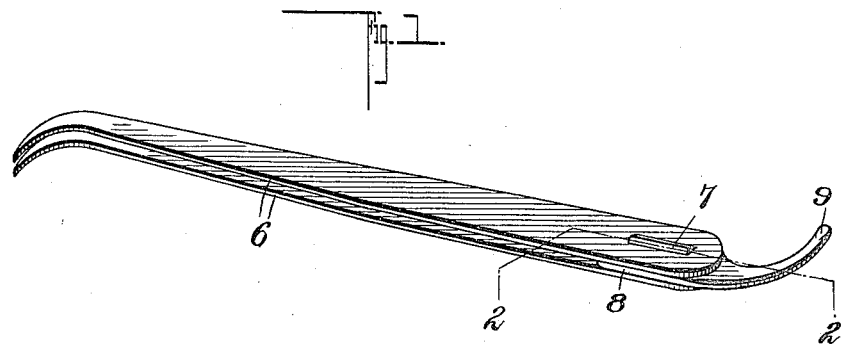
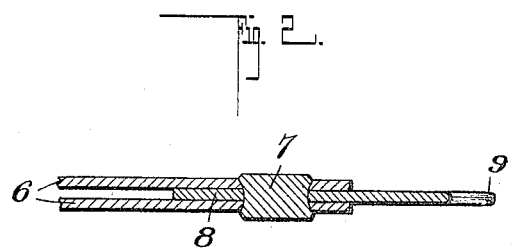
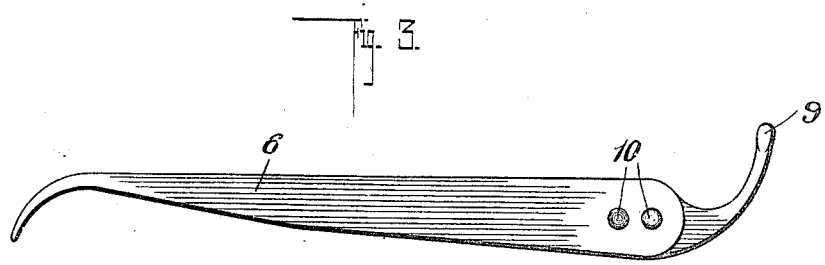

UNITED STATES PATENT OFFICE.

EDWARD W. WALLACE, OF LAKE BLUFF, ILLINOIS.

DENTAL INSTRUMENT.

951,891. Specification of Letters Patent. Patented Mar. 15, 1910.

Original application filed February 6, 1909, Serial No. 476,380. Divided and this application filed July 22, 1909. Serial No. 509,001.

*To all whom it may concern:*

Be it known that I, EDWARD W. WALLACE, a citizen of the United States, residing at Lake Bluff, in the county of Lake and State of Illinois, have invented certain new and useful Improvements in Dental Instruments, of which the following is a specification.

This invention relates to dental instruments, and the present application is a division of my application Number 476380, filed February 6, 1909.

The invention comprises especially a construction of tweezers, embodying in combination or connection therewith another tool for cleaning out cavities in teeth, and the object thereof is to provide an instrument having the parts referred to arranged in a novel manner and which may be cheaply constructed by being stamped out of sheet metal, as well as other advantages to be hereinafter disclosed.

In the accompanying drawings, which illustrate my invention and form a part of this specification, Figure 1 is a perspective view of the instrument; Fig. 2 is a section on the line 2—2 of Fig. 1, and Fig. 3 is a side view of a slightly modified form.

The tweezers are formed by two similar jaw members 6 which, in the form shown in Figs. 1 and 2, are secured at their rear ends by a single rectangular rivet 7, passing also through the forward end of a rearwardly extending shank 8, which forward end of said shank 8 is thus maintained between the rear ends of said jaw members 6, giving the latter their required spring. In its length the shank 8 is curved and, at its rear end, is shaped to form a laterally presented digging point or spoon 9, especially designed for the purpose of cleaning out cavities.

While the rivet 7 is preferably made rectangular, as before stated, and elongated in the direction of the axis of the instrument, whereby to form a strong and lasting connection for the parts, I may, instead, employ two longitudinally alined circular rivets 10, as shown in the modified form, Fig. 3.

By the present construction, particularly that of the preferred form, in which there are but three parts, all of which may be stamped from sheet metal and cheaply assembled, I am able to provide a strong and durable instrument.

I claim:

1. A dental instrument comprising a pair of sheet metal tweezer jaws, and a piece fastened between the rear ends of the jaws having a tooth operating extremity.

2. A dental instrument comprising a pair of sheet metal tweezer jaws, a rectangular rivet connecting said jaws adjacent the rear ends, and a shank having its forward end arranged between the said ends of said jaws, and through which the rivet passes, said shank having a rear laterally curved point.

In testimony whereof I affix my signature, in presence of two witnesses.

EDWARD W. WALLACE.

Witnesses:
 JAMES DOUD,
 M. R. MCINTYRE.